United States Patent [19]
DeLisi et al.

[11] Patent Number: 5,583,973
[45] Date of Patent: Dec. 10, 1996

[54] MOLECULAR MODELING METHOD AND SYSTEM

[75] Inventors: Charles DeLisi, Boston, Mass.; James L. Cornette, Ames, Iowa; Benjamin L. King; Michael D. Silverman, both of Boston, Mass.

[73] Assignee: Trustees of Boston University, Boston, Mass.

[21] Appl. No.: 123,556

[22] Filed: Sep. 17, 1993

[51] Int. Cl.$^6$ .................................................. G06T 15/00
[52] U.S. Cl. .................................................. 395/120
[58] Field of Search .................................... 395/118–120; 364/468, 474.24; 434/277, 2–82

[56] References Cited

U.S. PATENT DOCUMENTS

| | | | |
|---|---|---|---|
| 4,770,182 | 9/1988 | Damadian et al. | 128/653 |
| 4,821,213 | 4/1989 | Cline et al. | 395/124 |
| 4,879,667 | 11/1989 | Gorski et al. | 364/522 |
| 4,879,668 | 11/1989 | Cline et al. | 395/124 |
| 4,961,154 | 10/1990 | Pomerantz et al. | 364/522 |
| 5,079,699 | 1/1992 | Tuy et al. | 364/413.22 |
| 5,088,647 | 2/1992 | Bynum | 364/474.24 |
| 5,110,297 | 5/1992 | Teague | 434/278 |
| 5,121,329 | 6/1992 | Crump | 364/468 |
| 5,197,013 | 3/1993 | Dundorf | 364/474.24 |
| 5,229,935 | 7/1993 | Yamaguchi et al. | 364/413.22 |
| 5,280,569 | 1/1994 | Tsujido | 395/127 |
| 5,287,435 | 2/1994 | Cohen et al. | 395/118 |
| 5,301,117 | 4/1994 | Riga | 364/468 |
| 5,345,490 | 9/1994 | Finnigan et al. | 378/8 |
| 5,365,996 | 11/1994 | Crook | 164/45 |
| 5,370,692 | 12/1992 | Fink et al. | 623/16 |
| 5,377,116 | 12/1994 | Wayne et al. | 364/474.17 |

OTHER PUBLICATIONS

Beyer, CRC Standard Mathematical Tables, CRC Press, Inc (1978).

Bernstein, F. C. et al., "The Protein Data Bank: A Computer–based Archival File for Macromolecular Structures", *J. Mol. Biol.* 112:535–542 (1977).

Richmond, T. J., "Solvent Accessible Surface Area and Excluded Volume in Proteins", *J. Mol. Biol.* 178:63–89 (1984).

Brooks, C. R. et al., *J. Comp. Chem.* 4:187–217 (1983).

Saper, M. A. et al., "Refined Structure of the Human Histocompatibility Antigen HLA–A2 at 2·6 Å Resolution", *J. Mol. Biol.* 219:277–319 (1991).

Wesson, L. & Eisenberg, D., *Prot. Sci.* 1:227–235 (1992).

*Primary Examiner*—Heather R. Herndon
*Assistant Examiner*—Rudolph Buchez
*Attorney, Agent, or Firm*—Baker & Botts, L.L.P.

[57] ABSTRACT

A method, performed on a computer (10), for generating representations of a molecule, both two- and three-dimensional, is provided. The method includes establishing X, Y, and Z coordinate axes for the molecule to be modeled such that a rectangular region is established with sides parallel to the coordinate axes. The method also includes establishing a grid of coordinates on the X, Y, and Z coordinates axes with a grid mesh size of sufficient resolution to identify atom points of the molecule and solvent points. Next, the method includes identifying surface points which form a trace in one dimension in each Z cross-section, and generating tracing instructions for each Z cross-section by tracing along the surface points in the trace in each Z cross-section and writing the X, Y coordinates to instructions for controlling a computer display or for controlling a computer controlled milling machine. The method also includes generating on a computer display a two-dimensional grid and surface geometry for the molecule including atom identifications using the tracing steps for each Z cross-section. Additionally, the method includes cutting sheets representative of each Z cross-section with the milling instructions and assembling the sheets into three-dimensional models representative of the molecule.

18 Claims, 8 Drawing Sheets

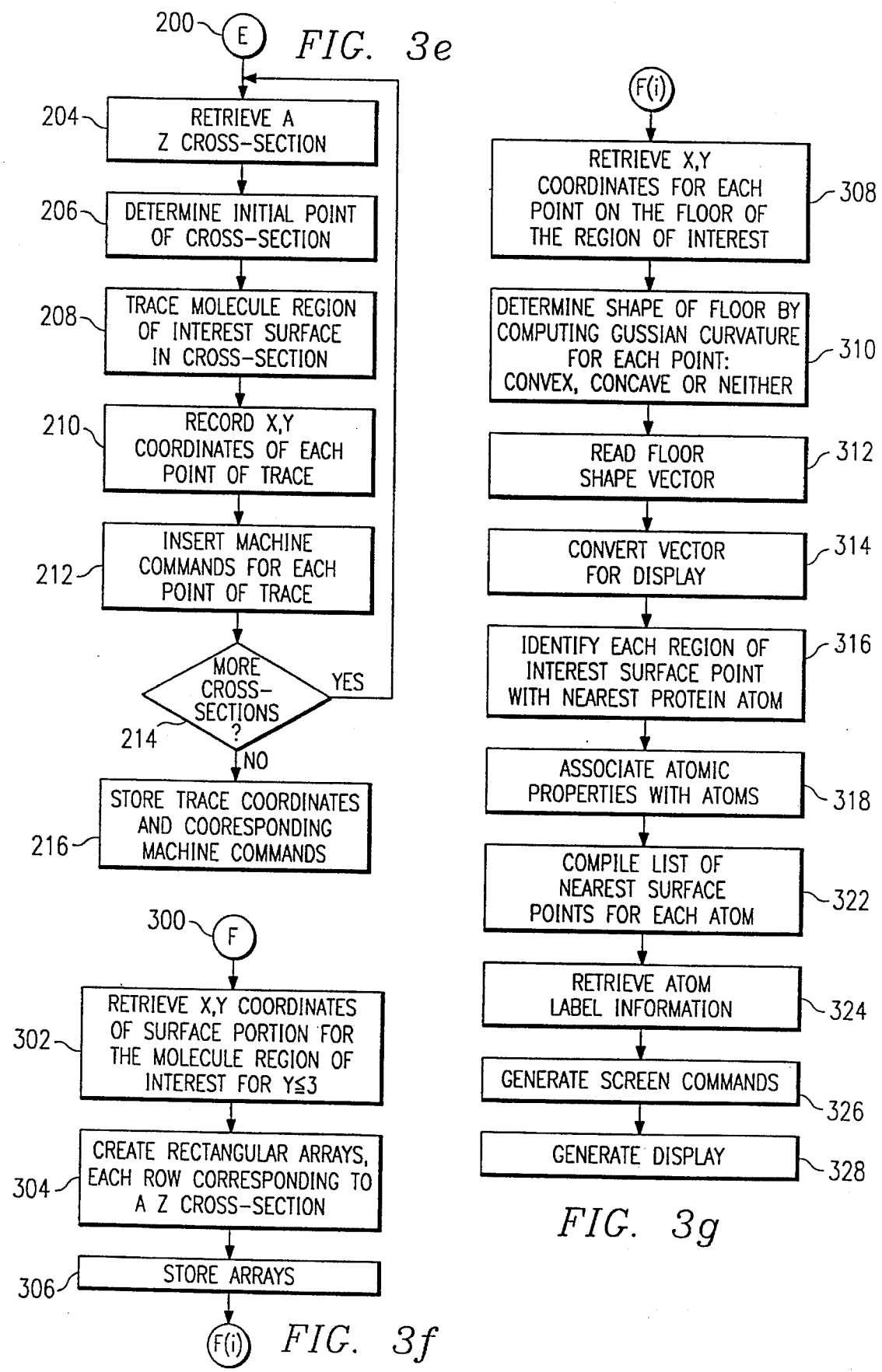

MOLECULAR MODELING METHOD AND SYSTEM

This invention was made with government support under AI 305 35-02 that was awarded by the National Institute of Health. The government has certain rights in the invention.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to computer-aided graphical representation and design of three-dimensional models of proteins or polynucleotides. The models evolve from computer graphical representations and provide a geometrically and chemically concise and detailed view of binding sites. The models provide sufficient detail to support binding specificity analysis of active sites involved in ligand binding.

2. Description of the Prior Art

Understanding protein structure is critical for developing a complete understanding of protein function. The development of crucial therapeutic agents is enhanced by a complete understanding of protein structure. Several proteins have binding regions for binding ligands and small molecules such as drugs and nucleotides. Among these proteins are receptors such as those involved in endocrine function, immune function, drug transport, and gene regulation. It is also beneficial to understand the ligand binding regions of polynucleotides.

Among the crucial regulatory elements of the mammalian immune system is a network of molecules encoded in the major histocompatibility gene complex (MHC), including the class I and II MHC products. Class I molecules are found on the surface of virtually every cell type, playing a central role in regulating the levels of cytotoxic and other CD8 T cells directed against infection. The closely related class II products are confined to immune cells and regulate the activity of T helper and other CD4 cells. Under normal conditions, class I and II molecules both migrate from the cell surface to its interior, where they bind to proteolytically digested protein fragments having approximately 9 and 13 to 17 amino acids for class I and II molecules, respectively. The complexes then cycle to the cell surface where, if the peptide is from a foreign protein, they are recognized by T cells of the appropriate type. Thus the binding site of the MHC molecules and the structure of the bound segment are of extraordinary interest and importance in understanding the immune system and in designing agents for regulating immune function. The binding sites in other proteins or peptides are also important, and agents for regulating endocrine or gene regulation would benefit from a more complete understanding of protein or peptide structure about the binding regions of those proteins or peptides.

Previous methods for producing molecular models of proteins or polynucleotides have several shortcomings. The classical 'ball and stick' method for creating molecular models is most suited to small molecules. Creation of ball and stick models of large molecular weight molecules is time consuming and cumbersome. The ball and stick models of large molecules do not reveal fine structural detail of binding sites such as supplied by the model approach disclosed and claimed in the present invention. Space filling models may likewise be used, but suffer from the same limitations as the ball and stick models.

Stereolithography is more suited to modelling larger molecules, but creation of stereolithographic models is time-consuming and expensive. The stereolithographic models do not depict atom placement, and do not provide a clear resolution of critical binding sites.

These and other disadvantages of the prior art are overcome by the present invention, and a method for generating models of proteins or polynucleotides is provided.

SUMMARY OF THE INVENTION

In accordance with the present invention, a method for generating or constructing computer-aided graphical representation and design of three-dimensional models of molecules such as proteins or polynucleotides is provided. More specifically, the invention relates to computer-aided graphical representations and design of binding sites. The models evolve from computer graphical representations and provide a geometrically and chemically concise and detailed view of binding sites. The models provide sufficient detail to support binding specificities analysis of active sites involved in ligand binding.

It is an object of the present invention to provide a method for generating or constructing computer-aided graphical representation and design of three-dimensional models of molecules such as proteins or polynucleotides.

It is a further object of the present invention to provide a method for generating or constructing computer-aided graphical representation and design of three-dimensional models of protein or polynucleotide binding sites.

It is a further object of the present invention to provide a method for generating a three-dimensional model of a molecule, comprising the steps of: establishing X, Y, and Z coordinate axes for the molecule to be modeled such that a rectangular region encompassing the region of interest is established with sides parallel to the coordinate axes; establishing a grid in the X, Y, and Z coordinate axes with a grid mesh size of sufficient resolution to identify atom points of the molecule and solvent points; identifying for each point in the rectangular grid an identity as an atom point, a solvent point, or an empty space point, labelling each point with a representative identifier, and storing the representative identifiers in a three-dimensional character array; identifying the surface points of the molecule which form a one dimensional curve in each Z cross section; generating milling instructions for each Z cross-section by tracing along the surface points in each Z cross section and writing the X, Y coordinates to instructions for controlling a computer controlled milling machine; storing the tracing steps for each Z cross-section and correlated machine instructions; retrieving the stored machine instructions and cutting sheets representative of each Z cross-section with the milling instructions and the computer controlled milling machine; and assembling the sheets into three-dimensional models representative of the molecule.

It is a further object of the present invention to provide a method for converting the character array of each Z cross section into a color picture depicting the amino acid type, number, and atom identification of each atom and solvent region, and assembling said pictures with the sheets to show atom location and identity.

It is a further object of the present invention to provide a method for generating a two-dimensional representation of a molecular surface, comprising the steps of: establishing X, Y, and Z coordinate axes for the molecule to be modeled such that a rectangular region encompassing the region of interest is established with sides parallel to the coordinate axes; establishing a grid in the X, Y, and Z coordinate axes with a grid mesh size of sufficient resolution to identify atom points of the protein molecule and solvent points; identifying the surface points which form a one dimensional curve in each Z cross section; generating tracing instructions for each Z cross-section by tracing along the surface points in each Z cross section and writing the X, Y coordinates to data files used for controlling a computer display; and generating on a computer display a two-dimensional grid and surface geometry for the molecule including atom characteristics and identifications using the stored coordinates of surface points.

These and other advantages of the present invention will become apparent from the following detailed description.

BRIEF DESCRIPTION OF THE DRAWINGS

For a more complete understanding of the present invention and the objects and advantages thereof, reference is now made to the following description taken in connection with the accompanying drawings in which:

FIGS. 3a–g are flow charts showing the steps executed by the modeling system of the present invention to display or create a physical model of a MHC molecule;

DETAILED DESCRIPTION OF THE INVENTION

Figure 1:
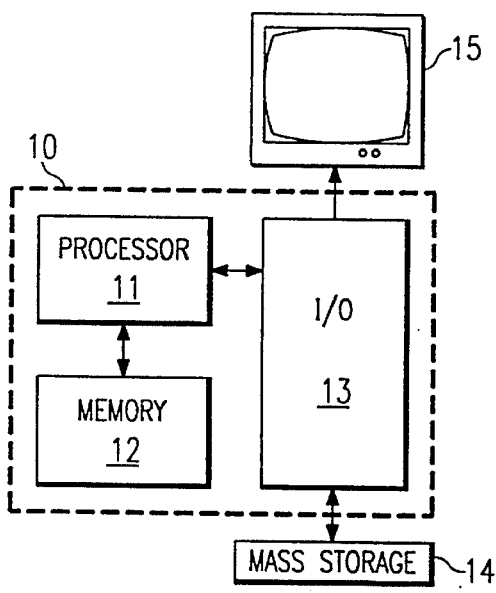
FIG. 1 depicts a representative system for modeling a MHC molecule.

The method for molecular modelling as described herein can be used on any molecule such as, but not limited to proteins or polynucleotides. The method is useful for modelling proteins including, but not limited to, those proteins having an alpha helix or pleated sheet structure. The term "protein" as used herein refers to proteins or peptides. The method may also be used to model polynucleotides such as, but not limited to DNA or RNA. The method may also be used to model selected molecular regions of interest. Such selected regions of interest include, but are not limited to, binding regions (such as binding clefts) for binding ligands such as other proteins, peptides, nucleotides, amino acids, organic molecules (such as drugs or hormones), metals, nutrients, or other ligands of interest. The term "cleft" as used herein refers to a region of interest. The binding region may be an area of the molecule that binds components such as, but not limited to, small organic molecules, drugs, peptides, other proteins, nucleotides, RNA, and/or DNA.

To practice the present invention, the molecular crystallographic structure is required, and may be obtained through any classical techniques for assessing crystallographic structure. Many such structures are obtainable through data base files such as, but not limited to, the Brookhaven Protein Data Bank or the European Molecular Biology Laboratory (EMBL) Data Bank.

The method is most useful for generating models of protein receptors, such as those involved in endocrine or immune function. Receptors amenable to this approach include, but are not limited to the MHC complexes, immunoglobulins, T-cell receptors, estrogen receptors, progesterone receptors, drug binding proteins such as, but not limited to albumin, alpha-1 antitrypsin, and enzymes that catalyze reactions by binding to one or more substrate molecules.

Briefly, the method involves reading a data base file of the molecular structure and translating and rotating coordinates so that a rectangular region is established. Models of the entire molecular structure or of particular regions of the molecule may be generated. Particular regions that may be modelled include binding sites or clefts.

On a rectangular grid surrounding the region of interest, "points" are identified and marked with key identifiers. An "atom point" is a grid point within an atom radius of the center of an atom. A "solvent point" is a grid point that is inside the sphere of the radius of a water molecule (about 1.3 Å to about 1.5 Å, and preferably about 1.4 Å) that does not intersect any atom. The set of solvent points defines the solvent accessible volume. An "empty space point" is a grid point that would otherwise be considered a solvent point, but that is inaccessible to a solvent. A "surface point" is a solvent grid point that has adjacent to it a point that is not a solvent point. The set of surface points approximates the surface of a molecule. A "large solvent point" is a grid point that is within a sphere of about 2.0 Å to about 5.0 Å, and preferably about 3 Å that does not contain any point within an atom radius of the center of an atom. The "potential pocket points" is the difference between the set of "solvent points" and the set of "large solvent points". Not all potential pocket points are pocket points, as some sections of potential pocket points are too shallow to accommodate side chain atoms. "Pocket points" are defined to be potential pocket points lying within a 0.4 to 0.8, and preferably about 0.6 Å sphere of potential pocket points.

A sufficiently small grid mesh size should be used to attain sufficient resolution of the points. This is usually about one-fifth of the atomic radius. A suitable grid mesh size is about 0.1 Angstroms to about 0.4 Angstroms, and more preferably about 0.2 Angstroms (Å).

A solvent point within the binding region is identified and additional solvent points that can be connected to it by a chain of adjacent grid points are identified. These points constitute the binding region. Any binding region point adjacent to a non-binding region point with the same Z-coordinate is designated a surface point. The atom points may be marked for color coding. Atom points about 0.7 to about 0.9 times, and more preferably about 0.8 times the radius of the atom to the atom center according to its atom type may be marked. The term "atom type" as used herein refers to backbone and/or side chain carbon, nitrogen, oxygen, phosphorous, and/or sulfur.

The modelling system of the present invention provides for an automated method for generating physical models of a molecular cleft or region of interest. Alternatively, a 2-dimensional grid and display of surface geometry with atom information may be displayed on a suitable computer terminal.

Graphics that display cross sections of the binding site with the identities and positions of atoms near the binding site clearly marked may be generated. Using the grid points in the surface of the binding site, two-dimensional maps of the surface with various atom characteristics and locations on the surface may be displayed. These cross sections and surface pictures are particularly useful in comparing different structures of binding sites. For example, the different MHC class I molecules are very similar in backbone conformations, so that they and their binding sites can be easily aligned, although the clefts or binding sites have notably different geometry and surface features.

FIG. 1 depicts a representative system for molecular modeling. Shown in FIG. 1 is computer system 10 including processor 11, memory 12, and input/output (I/O) 13. Computer system 10 can be embodied in many forms so long as the system provides sufficient processing power to execute the modeling system of the present invention. It is envisioned that computer system 10 could be embodied in a personal computer, workstation, or mainframe computer. In computer system 10 is shown processor 11 for controlling and executing the steps of the modeling system of the present invention. Processor 11 could be embodied in a single processor or multiple processors. Connected to processor 11 can be memory 12 which may be any suitable form of memory typically used in the art to store instructions executed by processor 11 and other data. Providing connection to system 10 is I/O 13. I/O 13 of the present invention provides the necessary translation of signals between computer system 10 and peripheral devices. Shown in FIG. 1 are examples of two peripheral devices that may be connected to system 10; mass storage 14 and display 15. Mass storage 14 can be any data storage system available in the art, including, but not limited to; hard disc drives, floppy disc drives, magnetic disc drives, optical storage, and CD ROM. Display 15 (such as, but not limited to, a computer terminal and/or printer) is shown connected to system 10 and can be used to display information and data processed by system 10 of the present invention. It is noted that processor 11, memory 12, and I/O 13 of computer system 10 can be embodied as separate discrete devices, or implemented on a single integrated circuit chip without affecting the inventive concepts of the present invention. It is envisioned that in alternate embodiments of the present invention, computer system 10 may be a programmable controller.

Figure 2:
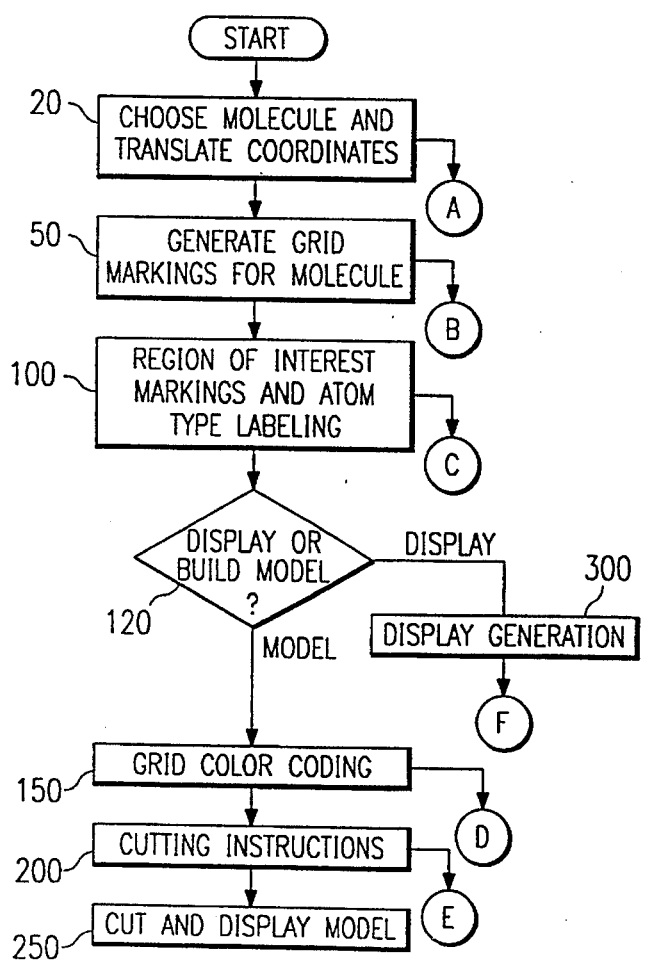
FIG. 2 is a top level flow diagram of the process of the present invention for making MHC molecular models.

FIG. 2 depicts a flow chart of the process for molecular modelling of the present invention. FIG. 2 is a top level diagram with additional detail provided in FIGS. 3a through 3g and related discussions. The steps of FIGS. 2 and 3a–g are representative of the steps that can be executed by computer system 10 of FIG. 1. The programming of system 10 in performing the modelling system of the present invention can be developed with standard programming techniques which are well known in the art.

In FIG. 2 at step 20, a molecule is chosen and the representative file is retrieved from a database. A region of interest of the molecule is selected and the coordinates of the molecule are also translated to align with the region of interest in step 20. At step 50, a grid is established for the molecule, and on the grid, the atom and solvent points are labelled. Next, the region of interest of the molecule is identified and its surface is marked at step 100. Also in step 100, the atom points are labelled by atom type. A decision on whether to proceed to building a physical model or a display of the molecule occurs at step 120. Should a physical model be the choice, at step 150, the grid information from step 100 is converted into pixel colors for graphical displays incorporated as pictures in the assembled model. In step 200, the X and Y coordinates for the surface points in each Z cross-section are retrieved and written to a file together with instructions to control a milling machine. In step 250, the outputs of step 150 and 200 can be used to cut and build a model for display.

Also available in the modelling system of the present invention is step 300 wherein a portion of the molecular surface may be transformed into a two-dimensional grid and displayed and printed by a color printer. A display of the molecule on a computer terminal may include surface geometry and atom information.

Appendix A includes a preferred embodiment of a computer program that may be used to execute the molecular modelling process of the present invention and will be referred to in this description. It is noted that reference to Appendix A is by way of example only to teach the inventive concepts of the present invention, and is not intended to limit the scope of the present invention.

Figure 3A:
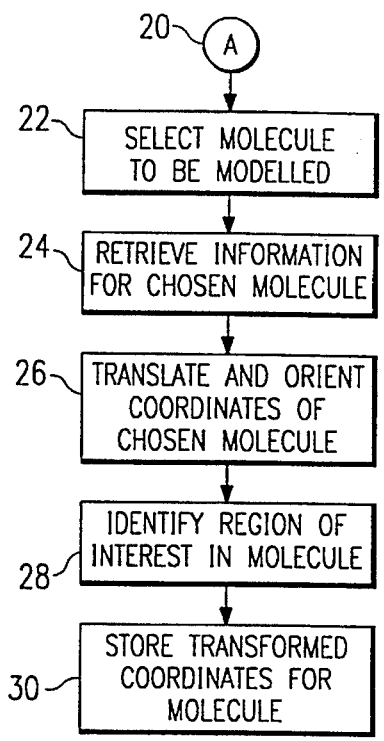

FIG. 3a shows further detail of the steps executed by system 10 for step 20 of FIG. 2. The molecule to be modeled is selected at step 22, and in step 24 the chosen molecule is retrieved from memory 12 or mass storage 14.

Figure 4A:
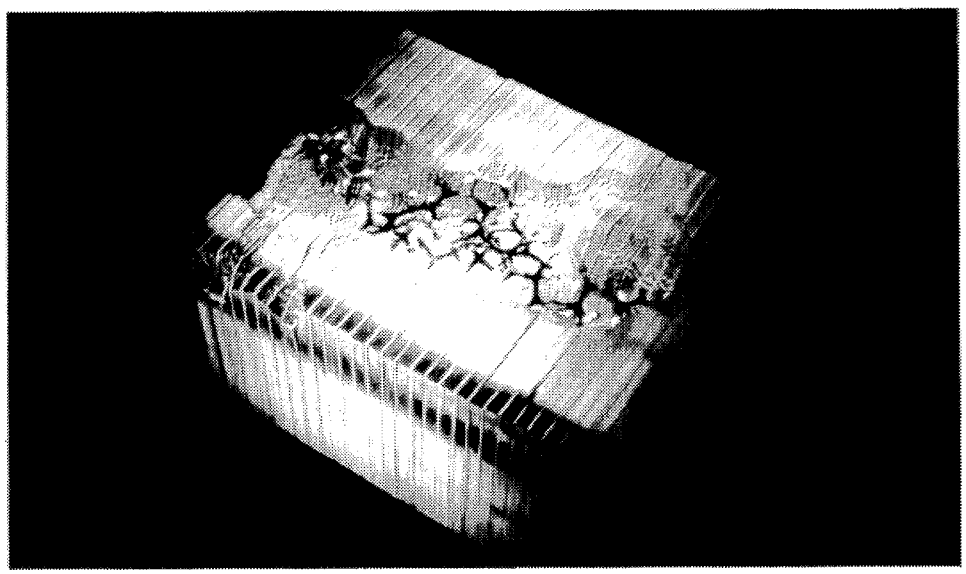
FIG. 4(a) depicts the plastic model of the cleft.

In step 26, processor 11 translates and rotates the coordinates of the molecule such that a rectangular region with sides parallel to the coordinate axes are established. The coordinate origin and axes can be established in any particular region of interest of the molecule. For example, the edges of the model shown in FIG. 4(a) are each parallel to one of the coordinate axes.

In step 28, a particular region of interest of the molecule maybe identified. In step 30, the transformed coordinates for the molecule are stored in either memory 12 or mass storage 14. Referring to Appendix A, the specific programming steps of FIG. 3a may be found under the heading ORIENT$_{13}$MHC.F, on pages 1 to 13.

Figure 3B:
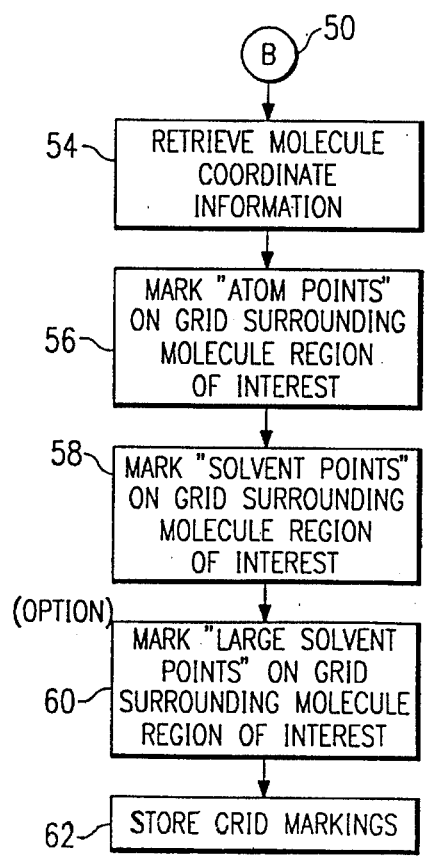

FIG. 3b shows additional detail for step 50 wherein the grid markings of the molecule are generated. In one embodiment of the present invention, a grid mesh size of 0.2 Å has been successfully used. The grid marking step is initiated by processor 11 at step 54 wherein the molecule coordinate information is retrieved from memory 12 or mass storage 14. In step 56, the grid points surrounding the molecular region of interest that are within an atom radius of the center of the atom are marked as "atom points." In step 58, grid points that are within a sphere the size of a water molecule (about 1.3 Å to about 1.5 Å, and preferably about 1.4 Å) that do not contain any point within an atom radius of the center of an atom are marked as "solvent points." Step 60 is an optional step wherein grid points that are within a sphere of about 2.0 Å to about 5 Å, and preferably about 3.0 Å that do not contain any point within an atom radius of the center of an atom are marked as "large solvent points." The difference between the "solvent points" set and the "large solvent points" set is considered to contain the "pockets" of the region of interest. The outputs of steps 56, 58 and 60 (when included) make up an array showing successive Z cross-sections of the grid. The grid markings are stored, and in the exemplary code of Appendix A, this information is placed in the file entitled ATOM_SOLVENT.DAT in memory 12 or mass storage 14. An exemplary of the computer program that may be executed by processor 11 for the steps of FIG.

3b may be found in Appendix A under the heading ATOM_SOLVENT.F, on pages 11–16.

Figures 3C, 3D:
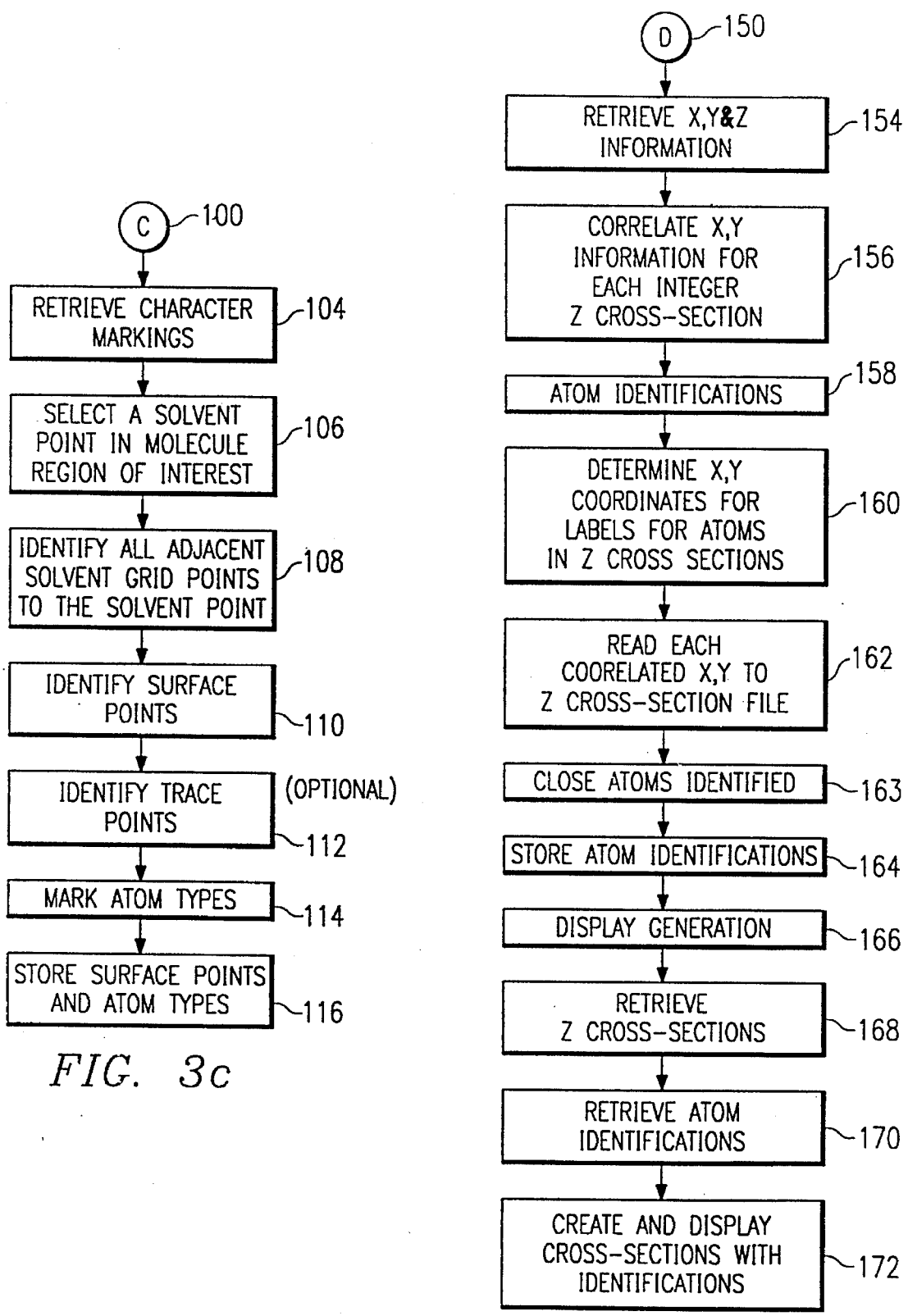

Depicted in FIG. 3c is a flow chart showing the steps executed by processor 11 in the molecular modelling system of the present invention wherein the atoms in the region of interest are identified and labelled. Beginning at step 104, the atom and solvent markings from step 62 in FIG. 3b are retrieved from memory 12 or mass storage 14. Next, beginning at step 106, an initial point clearly within the solvent region of interest is chosen. In step 108 all of the solvent points that can be connected to the initial point by a chain of adjacent solvent grid points are identified. These chosen points constitute the region of interest. In step 110, the surface points are identified as any cleft point adjacent to a non-cleft point with the same Z coordinate. Optional step 112 may be included in an aspect of the invention wherein the trace points for cutting plastic sheets corresponding to the Z cross-sections are identified. Each model piece is a plastic sheet of thickness appropriate to the scale of the model cut along the trace, thus marking the surface of the molecule. The plastic piece represents a cross-section of the molecule. When the pieces are assembled the whole represents either the molecule or a portion of the molecule comprising and surrounding the region of interest.

In step 114 of FIG. 3c, the grid points are marked according to atom type if they are as close to an atom center as 0.7 to about 0.9, and preferably about 0.8 times the radius of the atom. Any marking scheme may be used. A marking scheme of representative identifiers that may be successfully used for marking the atom types is as follows: "c" for backbone carbon, "n" for backbone nitrogen, "o" for backbone oxygen, "s" for sulfur, "g" for sidechain carbon, "m" for sidechain nitrogen, and "p" for sidechain oxygen. In step 116, the surface point and atom type information including the representative identifiers is stored in memory 12 or mass storage 14. A symbol may be used to mark the surface points. A suitable symbol, such as "t" may be used to mark the surface points. An example is shown in FIG. 4(c) of the character data file that stores the atom type information and surface points used to make FIG. 5d (also shown as part of the model in FIG. 4b). In the example of Appendix A, the program for the steps of FIG. 3c may be found under the heading CLEFT_SURF_ATOM_TYPE.F on pages 17–25.

Returning to FIG. 2, step 120 is shown following the completion of the region of interest marking and atom type labelling step 100. At step 120 a query is made as to whether a physical model of the molecule shall be prepared, or if a display of the molecule shall be generated. The generation of a physical molecule model takes the flow to step 150 and the generation of a display of the molecule proceeds at step 300. It is noted that the system of the present invention may simultaneously generate a display of the molecule at step 300 while also executing the steps to build a physical model at steps 150 through 250.

FIG. 2 shows grid color coding step 150. In step 154, the X, Y, Z information of the grid is retrieved from memory 12 or mass storage 14. In step 156 the X, Y information is correlated to each integer Z cross-section by processor 11. In step 158 atom labelling for the protein molecule is initiated. In step 160, the X, Y coordinates for labels for atoms in each Z cross-section are determined. The oriented coordinate data for each Z cross section is read by processor 11 from memory 12 or mass storage 14 in step 162, and in step 163 the atoms within 0.63 Å of each Z cross-section are determined and the atom identification X, Y coordinates are stored in step 164. FIG. 4(c) depicts the atom identification file of step 158, and Table 1 depicts the atom label file of step 164, for the single cross-section shown in both FIGS. 4d and 5d.

TABLE 1

| Label File Computed for a Single Z Cross Section | | |
|---|---|---|
| X | Y | Label |
| −7 | −40 | 7Y |
| −5 | −43 | N |
| 0 | −39 | 7Y |
| 2 | −42 | CA |
| 1 | −31 | 7Y |
| 3 | −34 | CB |
| 33 | −40 | 24A |
| 35 | −43 | C |
| 27 | −43 | 25V |
| 29 | −46 | N |
| 38 | 23 | 65R |
| 40 | 20 | C |
| 32 | 20 | 66K |
| 34 | 17 | N |
| 27 | 17 | 66K |
| 29 | 14 | CA |
| 21 | 16 | 66K |
| 23 | 13 | CB |
| 32 | 6 | 67V |
| 34 | 3 | N |
| 37 | −4 | 67V |
| 39 | −7 | CB |
| 43 | −2 | 67V |
| 45 | −5 | CG1 |
| −32 | −34 | 100G |
| −30 | −37 | CA |
| −39 | −33 | 100G |
| −37 | −36 | C |
| −55 | 15 | 158A |
| −53 | 12 | O |
| −43 | 11 | 159Y |
| −41 | 8 | CA |
| −46 | 4 | 159Y |
| −44 | 1 | C |
| −32 | 4 | 159Y |
| −30 | 1 | CG |
| −28 | −7 | 159Y |
| −26 | −10 | CE2 |
| −51 | −7 | 160L |
| −49 | −10 | CA |
| −57 | −7 | 160L |
| −55 | −10 | C |

In step 166, a display of the information generated in steps 150 to 164 may be generated on display 15. In step 168, the Z cross-section information is retrieved from memory 12 or mass storage 14, and in step 170, the atom identification information is retrieved from memory 12 or mass storage 14. Finally, in step 172, the display of cross-sections with atom identifications is generated by processor 11 and can be displayed on display 15. A silicon graphics workstation has been found to be suitable for displaying this information. The computer image can be printed on a color printer; a Textronic color printer has been found suitable, but other printers may also be used. In the exemplary program of Appendix A, the specific details of steps 150 through 172 of FIG. 3d can be found under the headings INTEGER_SECTION.F; ATOM_LABEL.F; and SECT_SCREEN_PLOT.F on pages 26 through 36.

In FIG. 3e is shown the steps executed by processor 11 in generating the instructions for cutting the pieces of a molecular model. In step 204, the data for a Z cross-section is retrieved. In step 206, an initial point of the surface of that Z cross-section is chosen and a trace of that Z cross-section is made in step 208. The trace is shown in FIG. 4(c) as those grid points marked with a "t". The X, Y coordinates for each step in that trace are stored in step 210, and in step 212, machine instructions that control a computer controlled milling machine for that trace are generated and stored. Typical machine commands are: turn on machine; move to X, Y position; lower milling machine; raise milling machine; raise and lower milling drill; and stop machine. These commands control the milling machine, thus creating a file that can be read by the milling machine causing it to cut plastic pieces representative of cross sections of the model. In step 214, a query is made as to whether all of the cross-sections of the molecule have been traced. If the answer is no, then the process returns to step 204. If yes, and there are no more cross sections to trace, then the process moves to step 216 where trace coordinates and corresponding machine commands may be stored in memory 12 or mass storage 14. The specific computer programming code for steps 200 to 216 of FIG. 3e may be found in Appendix A under the heading CUT.F on pages 37–61. It is noted that the order in which the grid color coding, beginning at step 150, and generation of cutting instructions, beginning at step 200, may be reversed without affecting the inventive concepts of the present invention.

FIGS. 3f and g depict the typical steps executed by the system of the present invention for generating a computer display containing two-dimensional grid and displaying surface geometry with atom information for a molecule. At step 302, the X, Y coordinates of the floor of the region of interest for Y less than or equal to 3.0 are retrieved from memory 12 or mass storage 14. In FIG. 4(c), the points of interest are below the solid horizontal line. In step 304, processor 11 generates two rectangular arrays from the X, Y coordinate information retrieved in step 302 wherein each row of one array contains the X coordinate of points in the trace in a single Z cross-section, the other array contains Y coordinates. The Z coordinates are stored in each array as row number. Typically, the rows run from positions −100 to 100. The zero (0) point (circled in FIG. 4(c)) corresponds to a position line parallel to the Z axis and the bottom of the region of interest which is used to align the traces. For the X coordinate data, each row entry is −999.0 until the trace crosses the Y=3.0 plane. After that, the entry in one array shows the X coordinate of the point in the trace until the trace emerges again above Y=3.0. The other array is similar, but contains Y coordinates of trace points. These arrays constitute a map from the integer positions of their entries onto the surface, and thus approximate a map from a plane region onto the surface of the region of interest.

An example of the steps that are executed by processor 11 to determine the curvature of a region of interest surface is depicted in FIG. 3g. At step 308, the X, Y, Z coordinates for each point on the region of interest floor are retrieved from the rectangular arrays created in step 304 of FIG. 3f. In step 310, at each point of the surface below Y=3.0 of the region of interest a vector normal to the surface and the Gaussian curvature of the surface is computed which determines whether the floor is convex, concave or neither from the perspective of the region of interest. In step 310 processor 11 computes a quadratic surface for each point that approximates the grid surface, and computes the normal vector and Gaussian curvature of the quadratic surface which are good approximations to the normal vector and Gaussian curvature of the cleft floor. The curvature values for points of the cleft floor are stored in an array similar to the arrays that store the X and Y coordinates.

Beginning at step 312 shows the steps that may be executed for displaying on display 15 a two-dimensional surface geometry and atom identification with the molecular modelling system of the present invention. In step 312, the floor curvature array is read, and in step 314 it is converted for display. In step 316 the atoms at the surface of the molecule are identified. The identification is accomplished as follows. For each point on the cleft floor the nearest protein atom is located and associated with that point. The atomic properties associated with each atomic type are identified in step 318 and also may be identified with that point. Typical atomic properties identified in step 318 may be, for example, hydrogen bonding potential, hydrophobicity, and atom temperature. In step 322 all the surface grid points associated with any single atom of the molecule are identified and the averages at their Z-coordinates and of row positions in the X-coordinate file are computed. These two numbers give the location of a label identifying the atom as being associated with the point on the surface of the molecular region of interest.

Steps 324–328 of FIG. 3g describe the generation of a display for the 2-dimensional grid and display surface geometry for a molecule. The atom label information is retrieved from memory 12 or mass storage 14 in step 324, and in step 326 the screen commands are generated by processor 11. Finally, in step 328, the display is generated at display 15. Again, a silicon graphics display has been found to be acceptable for use in the process of the present invention and a copy can be printed on a color printer. The specific coding to generate the 2-dimensional grid and display surface molecular region of interest described in steps 300–328 of FIGS. 3f and g can be found in Appendix A, pages 62–90, under the headings SURFACE.F; SURF_CONVEXITY.F; CONV_SCREEN_PLOT.F; SURF_ATOM_LABEL.F; and SURF_ATOM_SCREEN_PLOT.F.

Computer aided manufacturing may be used to construct outlines of the cross-sections in plastic sheets that may be assembled into novel three dimensional 'hard copy' models of the binding sites. These include any techniques for constructing plastic or laminate models that are known to those skilled in the art. The models are relatively easy to construct, accurate in identifying location of atoms, and provide insights not seen from 'ball and stick' or from space filling models.

FIG. 3e shows the steps typically executed by processor 11 in the system of the present invention in generating the milling instructions for making the pieces of the physical molecular region of interest model. The milling instructions that were stored in step 216 (See FIG. 3e) for the X, Y coordinates and corresponding machine instructions are retrieved from memory 12 or mass storage 14. Using a computer controlled milling machine, the pieces of the molecular model are cut. Any suitable scale may be used. The sheets may then be assembled in packets containing the appropriate color print for that cross-section as determined in step 150. The resulting slices can be assembled into a complete model of the region of interest with magnets embedded into the slices to hold the model together. The model can be separated between slices to examine the atom surrounding the region of interest.

The following examples serve to illustrate specific embodiments of the invention, but should not be considered as a limitation on the scope of the invention.

EXAMPLE 1

The following example shows how the process of the present invention was used to model MHC protein molecules.

The Brookhaven Protein Data Base [see, e.g., Bernstein, F. C., et al. *J. Mol. Biol.* 112, 535–542 (1977)] entries 3HLA (human leukocyte antigen-A2) and 2HLA (HLA-Aw68) were used. These differ from each other in 12 of the first 182 amino acids (which encompass the binding cleft), 11 of which have atoms exposed to the surfaces of at least one of the clefts. All of the graphics were developed on Silicon Graphics Iris work stations, but other suitable work stations may be used.

For both class I molecules, a rectangular X, Y, Z-coordinate system in the cleft based on certain a-carbon coordinates was located. Generally, the Y-axis is perpendicular to the β-sheet underlying the cleft, and the Z-axis is the long axis of the cleft. The centroid $C_1$ of the α-carbons of residues 50 to 84 (containing the $\alpha_1$ domain helices on one side of the cleft), and the centroid $C_2$ of the α-carbons of residues 138 to 173 (containing the $\alpha_2$ domain helices on the other side of the cleft) were computed. The origin of an initial coordinate system was midway between $C_1$ and $C_2$. The plane that was a least squares fit to all the α-carbons in residues 50 to 84 and residues 138 to 173 was computed. The Y-axis was perpendicular to this plane, oriented so that the α-carbon of the β-sheet residue 97 had a negative Y-coordinate. The Z-axis was chosen so that the Z,Y-plane was parallel to the line joining the two centroids of, respectively, the α-carbons of residues 60 to 64 and the α-carbons of residues 78 to 82, and oriented so that the α-carbon of residue 82 had a positive Z-coordinate. The X-axis was chosen to form a right handed system. From this initial coordinate system, the origin to the point was translated (0.0, 0.0, −14.0) to obtain a coordinate system well oriented and located with respect to the clefts in both HLA-A2 and HLA-Aw68. The origin was at the 'left' end of the cleft, near CE3 of Trp 167 in both molecules, and the points (0.4, 0.0, z) between z=2 and z=30 lay entirely within the cleft of both molecules. Cross sections of the cleft were labeled according to their Z-coordinate, so that cs5, for example, showed the z=5 cross section. The use of the averages of α-carbon coordinates made location of this coordinate system robust to small perturbations of atom coordinates between different class I molecules, thus providing a common reference frame for comparisons of these structures.

The coordinates of the Protein Data Bank files were translated and rotated to these coordinates, and applied to a 0.2 Å mesh grid covering $-12.0 \leq x \leq 12.0$, $-10.0 \leq y \leq 5.0$, and $0.0 \leq z \leq 32.0$. The programs used atomic radii as given either in ACCESS, which computes accessible surface area of a molecule [Richmond, T. J., *J. Mol. Biol.* 178, 63–89 (1984)], or the molecular modeling program CHARMm, [Brooks, C. R., et al. *J. Comp. Chem.* 4, 187–217 (1983)]. The CHARMm radii were about 10% larger than that of ACCESS, and produced a slightly smoother surface of the cleft. The figures shown here use the larger radii from CHARMm.

To identify the water accessible volume of the cleft, and the cleft surface, the atom points were first marked as the grid points whose distance from the center of an atom in the oriented molecule was less than the corresponding atomic radius. The marks were coded to reflect the atom type. At each of the remaining grid points, a sphere of radius 1.4 Å was centered, and if the sphere did not intersect any atom, every grid point within or on the sphere was marked as a potential cleft point. With this procedure, there were a few grid points marked as potential cleft points that were not between the two helices. In order to exclude these points, the cleft was defined to be the component of the potential cleft points that contained the grid point (0.0, 0.0, 14.0) which is midway between the centroids of the two helices and clearly is a cleft point. The cleft contained just those grid points that could be connected to the coordinates (0.0, 0.0, 14.0) with a chain of adjacent potential grid points.

The pocket points were next distinguished. The cleft points were distinguished that lay within a 3 Å sphere that did not intersect any atom. The points of the cleft not inside any of these larger spheres were considered to be potential pocket points. Some side chains of a peptide bound in the cleft were presumed to fit into the more confined regions of the cleft, surrounded closely by class I atoms, and would not be in the more open regions marked by the 3 Å spheres. Some sections of the potential pocket points were too shallow to accommodate side chain atoms, and pocket points were defined to be potential pocket points lying within a 0.6 Å sphere of potential pocket points.

The surface points were next identified, and defined to be a cleft grid point with a non-cleft grid point adjacent to it that had the same Z-coordinate.

Both 3HLA and 2HLA data files gave locations of water molecules. The grid points within those water molecules were marked for later graphics use. Mostly those molecules are buried within the protein; only three (in HLA-A2) of the water molecules in the water accessible volume were identified as being in the cleft.

Using a Silicon Graphics Iris work station, the grid data was converted to pictures of cross-sections of the molecule perpendicular to the Z-axis. Any atom with center within a distance of D=0.63 Å of a cross section was labeled at the center of its intersection with the cross section. Because D=0.5, every atom within the grid was marked on at least one integer-valued Z-cross section. Values of D=0.63 caused too much overlapping of labels.

The trace sequences were also used to map the floor of the cleft. The point of each trace for which x=0.4 Å (with smallest Y-coordinate if there were two or more) was chosen as a base point. x=0.4 was chosen because the interval of points (0.4, 0.0%), $0 \leq z \leq 32$ lay entirely within the clefts of both HLA-A2 and HLA-Aw68. The points of the cleft surface were assigned two-dimensional coordinates (s,t); s is z; t was essentially the distance along the curve, and specifically the location of the point in the trace relative to the base point, with negative t indicating a point that preceded the base point. The s,t-coordinate system facilitated mapping of the electrostatic, hydrophobic, hydrogen bonding, concavity/convexity characteristics of the surface of the cleft.

To display the pockets of the cleft, the concavity/convexity of the floor of the cleft were mapped: A point $(s_0, t_0)$ in the floor of the cleft was chosen. In the $(s_{-1}=s_0-1)$-trace, the point with t-coordinate $(t_{-2})$ closest in X,Y coordinates to $(s_{-1}, t_{-1})$ was identified. Continuing in this fashion, the t-coordinates $t_{-5}, t_{-4}, \ldots t_{+5}$ were obtained. The 11 traces surrounding $(s_0, t_0)$ were aligned so that $t_i$ was at the same level as $t_0$, i=−5,5. An 11 point by 11 point patch of the surface surrounding $(s_0, t_0)$ was identified. A quadratic in (s, t) was fit by least squares analysis to the X-coordinates of the patch, and a quadratic in (s, t) was fit to the Y-coordinates of the patch. The linear equation z=s was the best fit (exact) to the Z-coordinates of the patch. The Gaussian curvature of the surface defined by the quadratics was computed. If the Gaussian curvature was greater than 0.0, $(s_0, t_0)$ was a concave or a convex point, the distinction between concave or convex being made according to whether the second partial derivative of the quadratic approximation to X with respect to S was positive or negative.

FIG. 1 depicts the system used for modeling the MHC protein molecules, such as described above in the Detailed Description for all classes of proteins. The steps executed in modelling the MHC molecule as shown in the flow chart of FIG. 2 were executed by computer system 10 of FIG. 1.

In FIG. 2 at step 20, the MHC molecule was chosen and the representative file retrieved from the Brookhaven database as noted above. The coordinates of the MHC molecule were translated in step 20. At step 50, a grid was established for the MHC molecule, and on the grid, the atom and solvent points were labelled. Next, the cleft of the MHC molecule was identified, and the cleft surface marked at step 100. Also in step 100, the atom points were labelled by atom type.

FIG. 3a shows further detail of the steps executed by system 10 for step 20 of FIG. 2. The MHC molecule was selected at step 22, and in step 24 the molecule was retrieved from memory 12. In step 26, processor 11 translated and oriented the coordinates of the MHC molecule such that a rectangular region with sides parallel to the coordinate axes and containing the coordinate origin surrounded the cleft in the MHC protein. In the translation, the coordinates were rotated such that their origin was at the midpoint between the two centroids of the alpha carbons of the two alpha-helices of the protein molecule. The Y-axis was perpendicular to the plane that contained the two centroids and that was closest (in a least square sense) to the alpha-helices of the MHC molecule. The alpha-helices were by definition residues 50 to 84 (alpha carbon coordinates stored in the matrix P) and residues 138 to 173 (stored in the matrix Q). In the translation, residue 97 of the MHC molecule (stored in matrix R) had a negative Z coordinate. Finally, there was a rotation of the coordinates of the MHC molecule such that the interval between the average of the five alpha carbons of residue 60 to 64 and the average of the five alpha carbons of residue 78 to 82 was parallel to the Z-Y plane. In step 28, the cleft of the MHC molecule was identified, and in step 30, the transformed coordinates for the MHC molecule were stored.

Additional detail on step 50 of FIG. 2 involving the generation of grid markings for the present example is shown in FIG. 3b. In step 56, the grid points surrounding the MHC cleft that were within an atom radius of the center of the atom were marked as "atom points." In step 58, grid points that were within a 1.4 Å sphere that did not contain any point within an atom radius of the center of an atom were marked as "solvent points." In step 60, grid points that were within a 3.0 Å sphere that did not contain any point within an atom radius of the center of an atom were marked as "large solvent points." The difference between the "solvent points" set and the "large solvent points" set was considered to contain the "pockets" of the cleft. The outputs of steps 56, 58 and 60 made up an array showing successive Z cross-sections of the grid. The grid markings were stored placed in the file entitled ATOM_SOLVENT.DAT.

FIG. 3c provides additional information on step 100 of FIG. 2 as it pertains to this example. At step 104, the atom and solvent markings from step 62 in FIG. 3b were retrieved. Next, beginning at step 106, an initial point clearly within the protein cleft was chosen. In step 108 all of the solvent points that could be connected to the initial point by a chain of adjacent solvent grid points were identified. These chosen points constituted the MHC cleft. In step 110, the surface points were identified as any cleft point adjacent to a non-cleft point with the same Z coordinate. In step 114 of FIG. 3c, the grid points were marked according to atom type for any grid point that was as close as 0.8 times the radius of the atom to the atom center. FIG. 4(c) is an example of a file for a single (Z=10.0) Z cross-section.

In order to build a three dimensional physical model of the MHC molecule, the flow proceeded to step 154 of FIG. 3d. The X, Y, Z information of the grid was retrieved and in step 156 the X, Y information was correlated to each integer Z cross-section by processor 11. In step 158 atom labelling for the MHC molecule was initiated. In step 160, the X, Y coordinates for labels for atoms in each Z cross-section were determined. The oriented coordinate data for each integer Z was read by processor 11 from memory 12 in step 162, and in step 163 the atoms within 0.63 Å of each Z cross-section were determined and the atom identification X, Y coordinates were stored in step 164. Table 1 illustrates the information stored for a single (Z=10.0) Z cross-section.

In step 166, a display on display 15 of the information generated in steps 160 to 164 was initiated. In step 168, the Z cross-section information was retrieved from memory 12, and in step 170, the atom identification information was retrieved from memory 12. Finally, in step 172, the display of cross-sections with atom identifications was generated by processor 11 and displayed on display 15.

To generate a two dimensional display with atom identifications and surface geometry, the flow proceeded to step 302 in FIG. 3f. At step 302, the X, Y coordinates of the floor of the cleft for Y less than or equal to three were retrieved from memory 12. In step 304, processor 11 generated rectangular arrays containing X and Y coordinates of the cleft surface from the X, Y coordinate information retrieved in step 302 wherein each row in each array corresponded to a Z cross-section.

At step 308 in FIG. 3g, the X, Y coordinates for each point on the cleft floor were retrieved from the rectangular array created in step 304 of FIG. 3f. In step 310, the Gaussian curvature of the cleft surface was computed which determined at each surface point whether the floor is convex, concave or neither from the perspective of the cleft. In step 310 processor 11 computed a quadratic surface for each point that approximated the grid surface; the Gaussian curvature of the quadratic surface was taken to be the Gaussian curvature of the cleft surface.

In step 312, the floor curvature was read, and in step 314 it was converted for display. In step 316 the atoms at the surface of the MHC molecule cleft were identified. For each point on the surface the nearest protein atom was located. The centroid of all grid points associated with an atom was computed and used to locate an atom label.

The atom label information was retrieved from memory 12 in step 324, and in step 326 the screen commands were generated by processor 11. Finally, in step 328, the display was generated at display 15.

EXAMPLE 2

This example shows how a plastic model of the MHC binding cleft was generated. 3-dimensional plastic models of the clefts in HLA-A2 and HLA-Aw68 were constructed. These models were constructed at the scale 1 cm=1 Å and were particularly useful for modeling the position of an antigenic fragment in the binding site.

In FIG. 3e is shown the steps executed by processor 11 in generating the instructions for cutting the pieces of the MHC model. In step 204, the data for a Z cross-section was retrieved. In step 206, an initial point of the surface of that Z cross-section was chosen and a trace of the cleft surface in that Z cross-section was made in step 208. The X, Y coordinates for that trace were stored in step 210, and in step 212, machine instructions that controlled a computer controlled milling machine for that trace were generated and stored. The data were sent to a computer that controlled a three axis computer numerically controlled milling machine (TMC 1000, Light Machines Corporation, Manchester, N.H.). Using this machine, 2 mm by 15 cm by 24 cm cuts of acrylic sheets along the trace sequence were made, maintaining a 1 cm=1 Å scale in three dimensions. These sheets were then assembled in packets of 5. A color print of the appropriate integer cross section was placed between slices 1 and 2 of the packet to show the identity and locations of atoms surrounding the cleft. The five slices in each packet were held together with four plastic pegs, 1 cm long and 3/16 in diameter, inserted into holes drilled through the five slices and held in place with a two-part resin, Weld-On 40™. The resulting 32 packets were assembled into a complete model of the cleft. The program for cutting slices 2, 3, 4, and 5 of each packet of five included instruction to cut two 1.125 inch diameter circles towards the left and right edges of the slices. After assembly of the packets, two 0.25 inch thick, 1 inch diameter ceramic magnetic discs were placed in the resulting void space. These magnets firmly held the 32 packets together and in alignment. However, the model also may be separated between any two packets in order to examine the cleft at that cross section. Generation of the physical model required about 12 hours of machine time and 20 hours for two people to set up and assemble.

Shown in FIG. 4 are pictures of (a) the whole model of HLA-A2 with the influenza matrix peptide 58–66 (amino acids GILGFVFTL) fitting into the cleft, and (b) a portion of the model of HLA-A2 (pocket B) with the N-terminal glycine and isoleucine of that peptide.

Figure 4B:
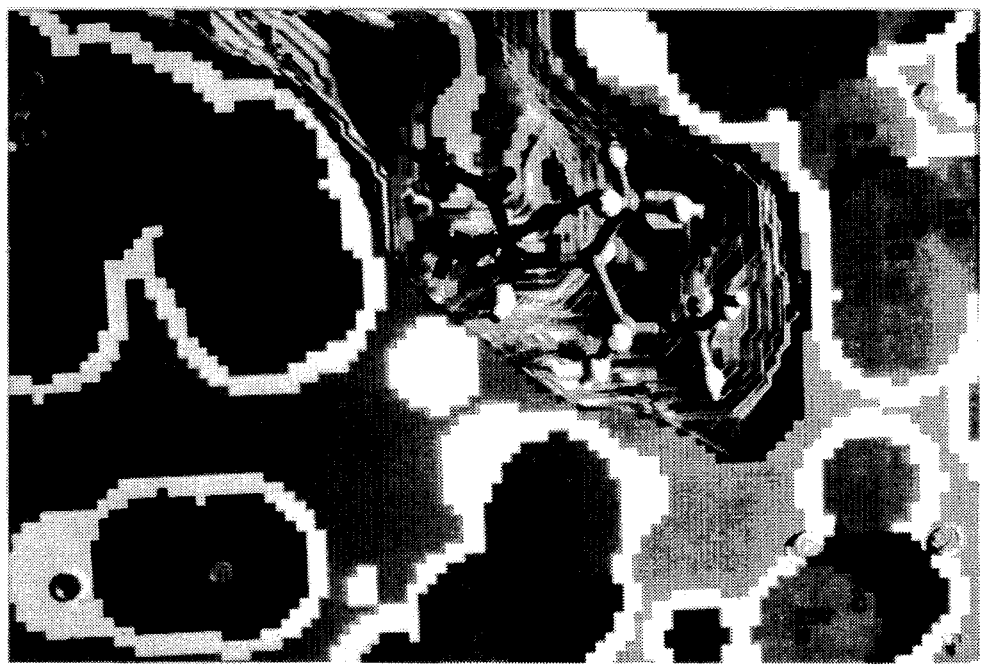
FIG. 4(b) depicts the B pocket with Ile 59 of influenza matrix antigenic peptide 58–66 (amino acids GILGFVFTL).
Figure 4C:
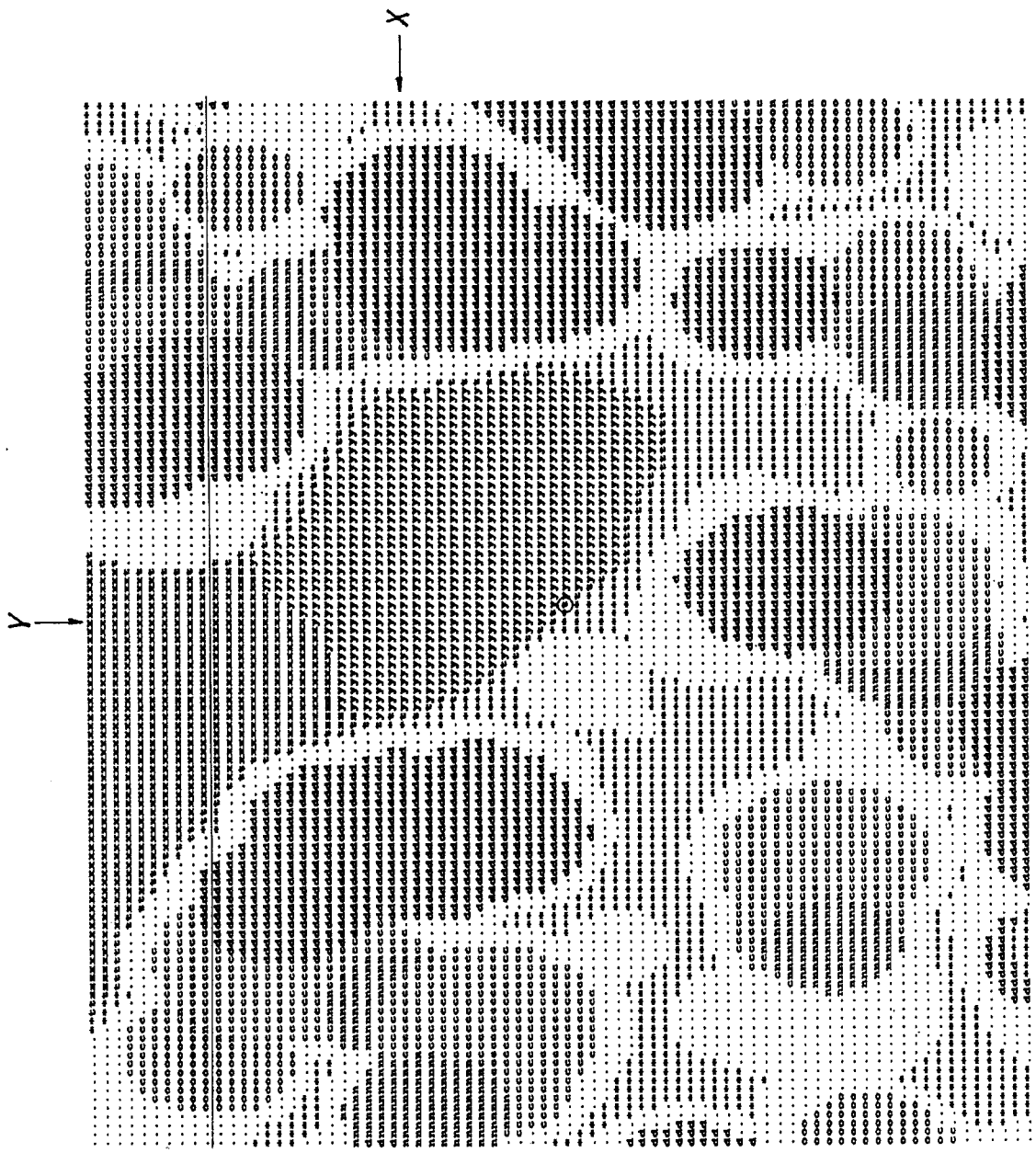
FIG. 4(c) depicts a typical character date file for a single Z cross-section.

The amino terminal Gly of the peptide was placed deep in pocket A of the cleft and does not appear in FIG. 4(a), but can be seen in FIG. 4(b). The peptide was made of HGS Biochemistry Molecular Model parts that also scale to 1 cm=1 Å. It was rather easy to manipulate the peptide within the cleft, and when an interesting position was found, to read the coordinates of the atoms of the peptide relative to the coordinate system established for the class I molecule. These coordinates could be read to within about 0.4 Å accuracy and readily adjusted to acceptable bond lengths and angles with CHARMm.

The model could be separated at any integer-valued Z-cross section to examine the class I atoms in that cross-section and their proximity to peptide atoms. The cross-section in the foreground of FIG. 4(b) was z=10 (cs10); pocket B ran approximately from cs8 to cs11. The preponderance of carbon atoms surrounding the pocket could be seen, making it suitable to accept an hydrophobic side chain such as the isoleucine shown in FIG. 4(a). The B pocket was well located to accept the second residue side-chain of the peptide.

Figure 5:
FIG. 5 depicts the cross sections 7–10 of HLA-A2, showing the geometry and surrounding atoms of pocket B, near Met 45.

"Pockets" in the cleft have been a major feature of the descriptions of the protein binding regions. Looking down into the plastic model one could easily see the cavities in the floor of the cleft that are referred to as pockets, and are believed to be the locations of the peptide amino- and carboxyl-end groups and certain peptide side chains. FIG. 5 depicts cross sections of Pocket B (the residue 45 pocket of HLA-A2) that were seen in the plastic model by separating the 1 cm slices. The delta sulfur (SD) and the epsilon carbon (CE) of methionine 45 appeared in the section cs7, giving way to an open region in subsequent sections cs8, cs9, and cs10. In HLA-B27, residue 45 is a glutamic acid, and the pocket is suitable for an arginine side chain with a long hydrophobic section capped with positively charged end atoms.

Figure 6A:
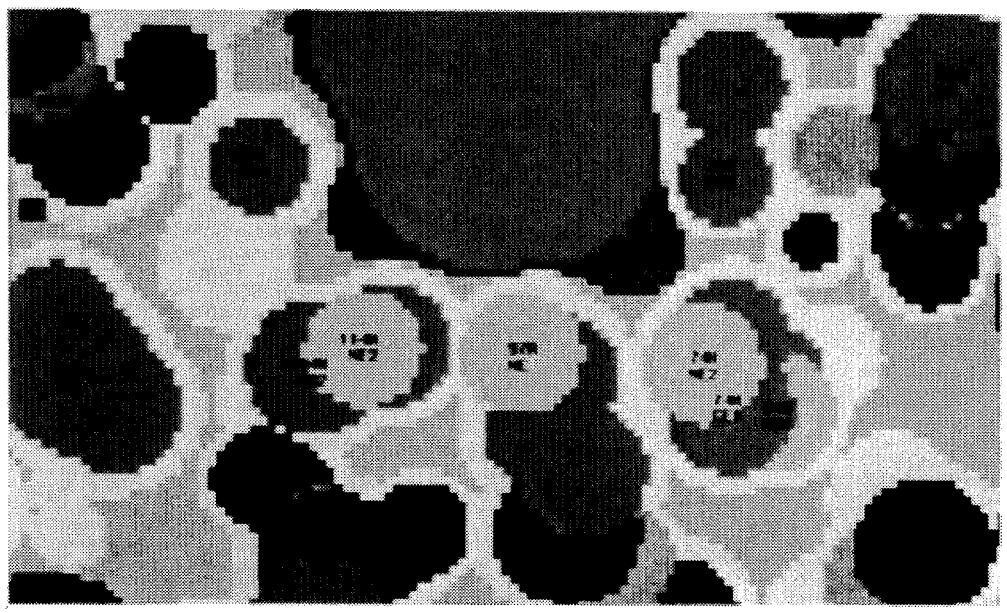
FIG. 6 depicts pockets C on the right sides of the clefts of (a) HLA-A2 and (b) HLA-Aw68.
Figure 6B:
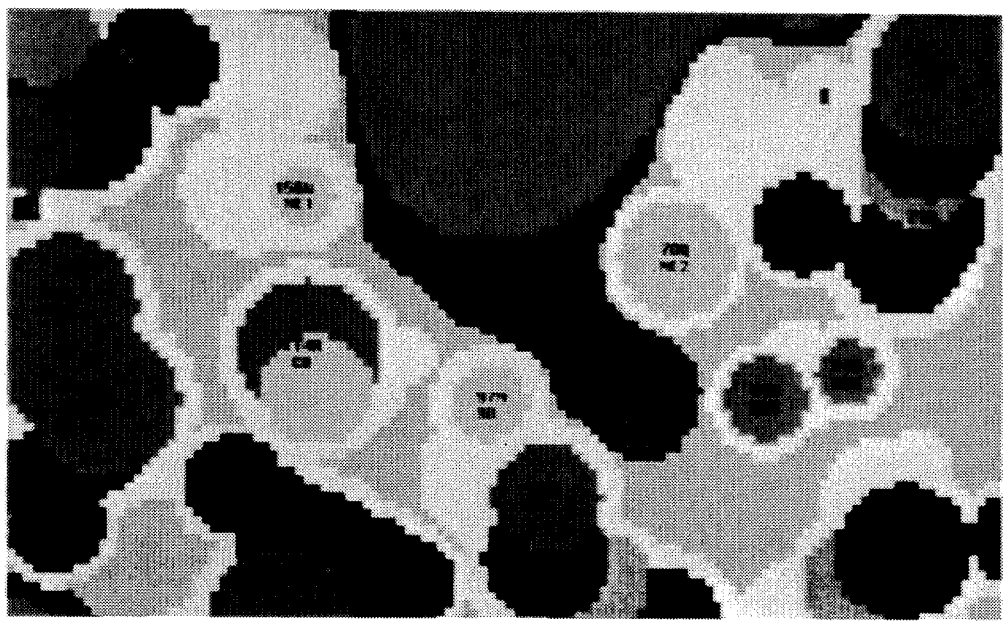

The cross sections were particularly useful for comparing differences in two or more clefts. Pocket C of HLA-A2 (FIG. 6a) was a minor indentation compared to Pocket C of HLA-Aw68 (FIG. 6b). As described by Saper, M. A., et al., *J. Mol. Biol.* 219, 277–319 (1991), pocket C in HLA-A2 is located on the inner wall of the $\alpha_1$ domain $\alpha$-helix above NE2 of His 74. Four of the 11 side-chain differences (residues 70, 74, 97, and 114) found in the clefts of these two molecules affected pocket C. Atoms from all four side-chains were seen in both cross sections. The much deeper pocket C in HLA-Aw68 strongly suggested a side-chain difference in the specificity of antigenic peptides that bind to HLA-Aw68 as opposed to HLA-A2.

Figure 7:
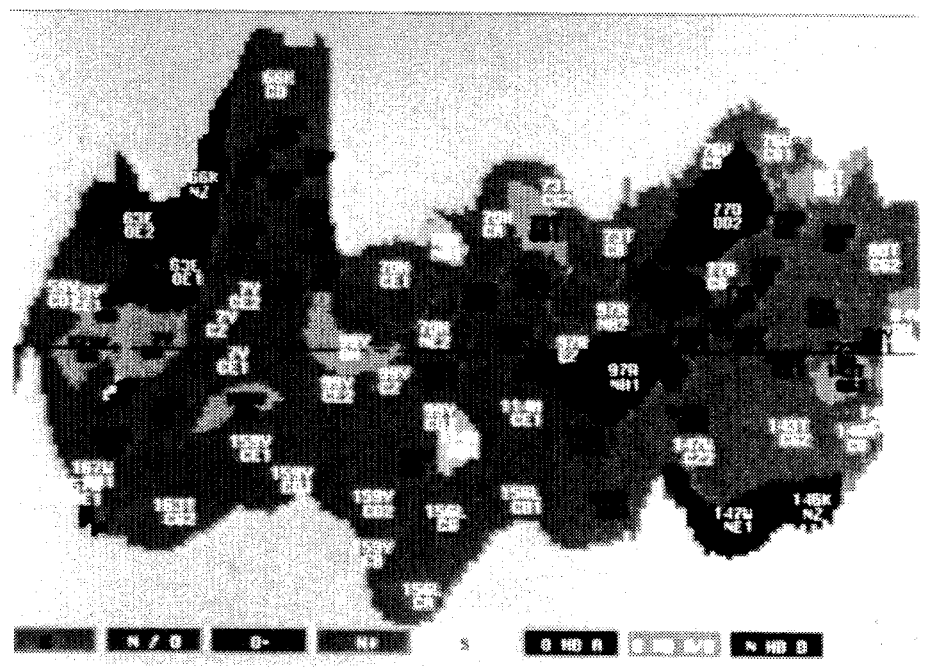
FIG. 7 depicts the hydrophobic and hydrogen bonding character of the floor and lower sides of the cleft.

The electrostatic, hydrophobic, and hydrogen bonding profiles of the cleft determine the binding characteristics of the class I molecule. FIG. 7 depicts a map of the floor of the HLA-A2 cleft showing chemical characteristics of the exposed atoms. Each grid point of the cleft was associated with the atom of the protein with surface nearest the grid point, and the physical/chemical characteristic of that atom was assigned to the grid point. The atomic solvation parameter types refined by Wessen, L. and Eisenberg, D., *Prot. Sci.* 1, 227–235 (1992) were used, yielding five categories: carbon, uncharged oxygen or nitrogen, sulfur, charged oxygen, and charged nitrogen. Wessen et al. suggested that for the shared charge pairs in Glu, Asp, and Arg, the atom with largest exposed surface area (number of associated grid points) should be shown as charged. This procedure was used with the exception that salt bridges involving exposed atoms were first determined as charged atoms. The uncharged side chain oxygens and nitrogens were further distinguished as hydrogen bond donor/acceptor according to Ippolito, et al., *J. Mol. Biol.* 215, 457–471 (1990). The uncharged nitrogens were marked as donors in all side chains except His, in which the nitrogens were marked as acceptor/donor. The uncharged oxygens were marked as acceptors in all side chains except Ser, Thr, and His, in which the hydroxyl oxygens were shown as acceptor/donors.

The effect of first marking the atoms in salt bridges as charged could be seen in Arg 97, where NH2 was clearly interacting with OD1 of Asp 77. NH2 of Arg 97 had a smaller exposed surface area than did NH1, and OD1 had a smaller exposed surface area than did OD2 of Asp 77. Nevertheless, Arg 97 NH2 and Asp 77 OD1 were well positioned to form a salt bridge (the distance between the centers was 3.110 Å), and were marked as the charged atoms of the respective side chains.

"Concave" and "convex" are defined from the perspective of the protein. A point on the water accessible surface is a concave point if intervals connecting nearby surface points lie outside the protein (thus, on the water accessible side of the surface); convex means that intervals connecting nearby surface points lie inside the protein (on the protein side of the surface). The pockets of the cleft were generally associated with concave regions of the surface, and appeared in FIG. 7 as black areas. The white areas were convex regions and appeared as small bumps on the protein surface protruding into the cleft. Gray marked either relatively flat or saddle points of the surface. The maps were most accurate near the horizontal center line, where the vertical traces were aligned, and were limited to the floor of the cleft below $y \leq 3$ to avoid further distortion at the upper and lower edges.

Figure 8:
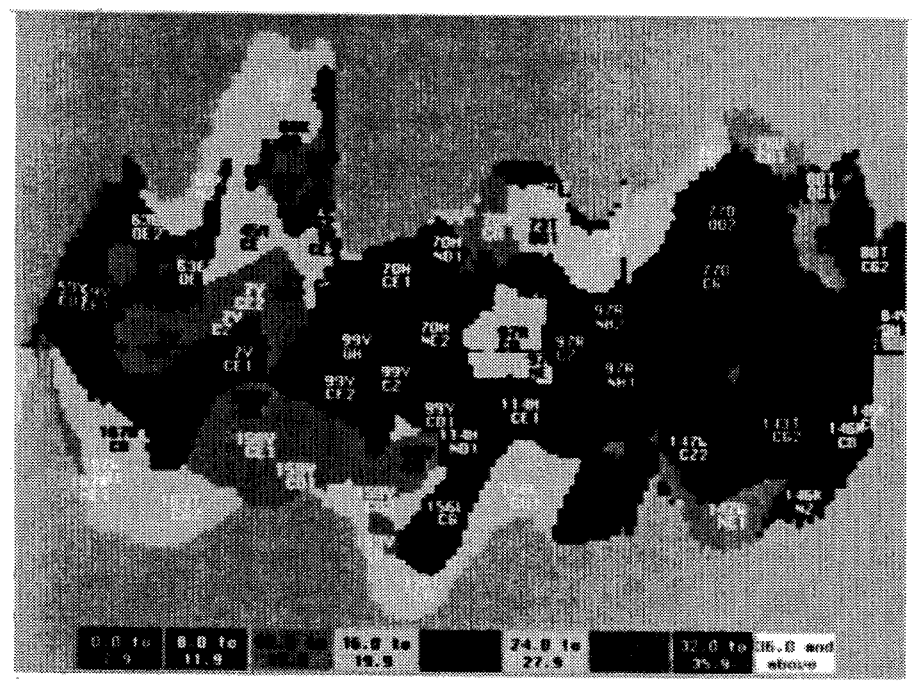
FIG. 8 depicts the thermal factors of the atoms of the surface of the MHC cleft.

Another feature of the cleft surface is the temperature factor of the surface atoms. Shown in FIG. 8 is a map of those temperature factors for the HLA-A2 cleft floor. It can be seen that atoms in one region, from Arg 97, His 114, and Tyr 116, had high thermal factors in the range from 32 to 40. A comparable picture of HLA-Aw68 showed no such high temperature cluster.

The plastic model we constructed was very accurate, stable and robust; the conformation of the cleft was well defined and clear. The model could be opened at any 1 Å Z-interval to observe the side chains and atoms forming the cleft at that point. Each atom was positioned exactly as in the original Protein Data Bank file, but only in that position. However, the exact definition of the cleft, including the clear identification of the pockets, has proven to be very valuable in understanding the positioning of the antigen in the cleft, and the positioning of antigen side chains into the cleft pockets.

Many other variations and modifications may be made in the methods herein described, by those having experience in this art, without departing from the concept of the present invention. Accordingly, it should be clearly understood that the methods described in the foregoing description are illustrative only, and not intended as a limitation on the scope of the invention.

What is claimed is:

1. A method for generating a three-dimensional model of a molecule, comprising the steps of:

establishing X, Y, and Z coordinate axes for the molecule to be modeled such that a rectangular region is established with sides parallel to the coordinate axes;

establishing a grid of coordinates on the X, Y, and Z coordinate axes with a grid mesh size of sufficient resolution to identify atom points of the molecule and solvent points;

identifying for each point in the rectangular grid an identity as an atom point, a solvent point, or an empty space point, labeling each point with a representative identifier, and storing the representative identifiers in a three-dimensional character array;

identifying an important component of a solvent region at a grid point within said solvent region and combining said grid point with all grid points that can be connected to it with a chain of adjacent solvent grid points;

identifying surface points which form a trace in one dimension in each Z cross-section;

generating milling instructions for each Z cross-section by tracing along the surface points in the trace in each Z cross-section and writing the X, Y coordinates to instructions for controlling a computer controlled milling machine;

storing the tracing steps for each Z cross-section and correlated machine instructions;

labeling surface points on sheets with representative identifiers at points corresponding to the identified points in the rectangular grid;

retrieving the stored machine instructions and cutting the sheets representative of each Z cross-section with the milling instructions and the computer controlled milling machine; and assembling the sheets, including aligning exposed representative identifiers, into labeled three-dimensional models representative of the molecule.

2. The method of claim 1, further comprising the steps of:

converting the character array of each Z cross-section into a color picture depicting the number and atom identification of each atom and solvent region; and assembling said pictures with the sheets to show atom location and identity.

3. The method of claim 1, wherein the molecule is a protein.

4. The method of claim 1, wherein the molecule is a polynucleotide.

5. The method of claim 1, wherein the X-coordinates and Y-coordinates of surface points are stored in respective two-dimensional arrays, with the X, Y coordinates of the surface points located by tracing along a single Z cross-section stored in a single column of each array, said column identifying the Z coordinates in each array.

6. The method according to claim 5, wherein said two separate two-dimensional arrays are used to compute a Gaussian curvature of the surface, and storing said curvature in a third two-dimensional array.

7. The method according to claim 6, wherein the third two-dimensional array is converted into a picture showing cavities in the surface.

8. The method according to claim 1, wherein each surface point is identified with the nearest atom of the molecule, and storing said identification in a two-dimensional array, with the identity associated with the surface points identified by tracing along a single Z cross-section being stored in a single column of the array.

9. The method according to claim 8, further comprising the step of identifying all the surface points associated with a single atom, locating the centroid of those surface points, and generating an identifying atom label attached to that centroid.

10. A method for generating a two-dimensional representation of the surface of a molecule, comprising the steps of:

establishing X, Y, and Z coordinate axes for the molecule to be modeled such that a rectangular region is established with side parallel to the coordinate axes;

establishing a grid of coordinates on the X, Y, and Z coordinates axes with a grid mesh size of sufficient resolution to identify atom points of the molecule and solvent points;

identifying for each point in the rectangular grid an identity as an atom point, a solvent point, or an empty space point, labeling each point with a representative identifier;

identifying an important component of a solvent region at a grid point within said solvent region and combining said grid point with all grid points that can be connected to it with a chain of adjacent solvent grid points;

identifying surface points which form a trace in one dimension in each Z cross-section;

generating tracing instructions for each Z cross-section by tracing along the surface points in the trace in each Z cross-section and writing the X, Y coordinates to instructions for controlling a computer display; and generating on a computer display a two-dimensional grid and surface geometry for the molecule including representative identifiers using the tracing steps for each Z cross-section.

11. The method of claim 10, wherein the molecule is a protein.

12. The method of claim 10, wherein the molecule is a polynucleotide.

13. The method according to claim 10, wherein each surface point is identified with the nearest atom of the molecule, and storing said identification in a two-dimensional array.

14. The method according to claim 13, further comprising the step of identifying all of the surface points associated with a single atom, locating the centroid of those points, and generating an identifying atom label attached to that centroid.

15. A system for generating a model of a molecule, comprising:

circuitry operable to establish a X, Y, and Z coordinate axes for the molecule to be modeled such that a rectangular region is established with sides parallel to the coordinate axes;

circuitry operable to establish a grid of coordinates on the X, Y, and Z coordinate axes with a grid mesh size of sufficient resolution to identify atom points of the molecule and solvent points;

memory operable to store the X, Y, and Z coordinate axes, cross-sections, and grid;

a processor operable to retrieve from memory the X, Y, and Z coordinate axes, correlated Z cross-sections, and grid and identify for each Z cross-section atom points, solvent points and empty space points in the grid, to identify an important component of a solvent region at a grid point within said solvent region and combining said grid point with all grid points that can be connected to it with a chain of adjacent solvent grid points, to label the atom and solvent points with representative identifiers, and store in said memory in a three-dimensional character array the representative identifiers;

wherein said processor is operable to identify surface points which form a trace in one dimension in each Z cross-section; and a computer display to display a two-dimensional grid and surface geometry for the molecule including representative identifiers using the tracing steps for each Z cross-section.

16. A system according to claim 15, further comprising:

a computer controlled milling machine and a computer controlled sheet marker;

wherein said processor is further operable to generate milling instructions for each Z cross-section by tracing along the surface points in the trace in each Z cross-section and writing the X, Y coordinates to instructions to control said computer controlled milling machine;

wherein said processor is further operable to store in said memory the trace steps for each Z cross-section and correlated machine instructions;

wherein said sheet marker is operable to label surface points on sheets with representative identifiers at points corresponding to the identified points in the rectangular grid; and wherein said milling machine is further operable to the cut sheets representative of each Z cross-section with the milling instructions.

17. A system according to claim 15 wherein the molecule is a protein.

18. A system according to claim 15 wherein the molecule is a polynucleotide.

* * * * *

UNITED STATES PATENT AND TRADEMARK OFFICE
CERTIFICATE OF CORRECTION

PATENT NO. : 5,583,973
DATED : December 10, 1996
INVENTOR(S) : Charles DeLisi, James L. Cornette, Benjamin L. King, Michael D. Silverman.

It is certified that error appears in the above-indentified patent and that said Letters Patent is hereby corrected as shown below:

Column 6, line 41, "ORIENT$_{13}$MHC.F" should read --ORIENT_MHC.F--.

Column 11, line 11, "a-carbon coordinates" should read --$\alpha$-carbon coordinates--.

Column 12, line 32, "D=0.5" should read --D>0.5--.

Column 12, line 33, "D=0.63" should read --D>0.63--.

Column 12, line 39, "(0.4,0.0%)" should read --(0.4,0.0z)--.

Signed and Sealed this

Twenty-fifth Day of February, 1997

Attest:

BRUCE LEHMAN

*Attesting Officer*         *Commissioner of Patents and Trademarks*